United States Patent
Huang et al.

(10) Patent No.: US 9,515,970 B2
(45) Date of Patent: Dec. 6, 2016

(54) TECHNIQUES FOR AUTO-DETECTING POSITIONS IN A MULTI-RESOURCE LOGIN CONTROL OF INSTANT MESSAGING

(71) Applicant: Cisco Technology, Inc., San Jose, CA (US)

(72) Inventors: Haihua Huang, Jiangsu (CN); Yong Qian, Jiangsu (CN); Zhao Jiayu, Jiangsu (CN); Kejun Xia, Jiangsu (CN)

(73) Assignee: Cisco Technology, Inc., San Jose, CA (US)

( * ) Notice: Subject to any disclaimer, the term of this patent is extended or adjusted under 35 U.S.C. 154(b) by 283 days.

(21) Appl. No.: 13/943,901

(22) Filed: Jul. 17, 2013

(65) Prior Publication Data

US 2015/0026265 A1    Jan. 22, 2015

(51) Int. Cl.
G06F 15/16 (2006.01)
H04L 12/58 (2006.01)

(52) U.S. Cl.
CPC ............. H04L 51/043 (2013.01); H04L 51/20 (2013.01)

(58) Field of Classification Search
CPC ........ H04L 29/06; H04L 67/02; H04L 51/043; H04L 51/20; H04W 4/14
USPC ........................................ 709/203, 207, 206
See application file for complete search history.

(56) References Cited

U.S. PATENT DOCUMENTS

| | | | | |
|---|---|---|---|---|
| 6,775,546 B1 * | 8/2004 | Fuller | ...................... | H04W 4/02 379/211.01 |
| 7,899,468 B2 * | 3/2011 | Lohtia | .................. | H04L 12/189 455/456.1 |
| 8,943,146 B2 * | 1/2015 | Lefrancois des Courtis | .................. | G06Q 30/02 709/206 |
| 2007/0180082 A1 * | 8/2007 | Abraham | ................ | H04L 67/18 709/223 |
| 2008/0313297 A1 * | 12/2008 | Heron | ................... | H04L 12/581 709/207 |
| 2010/0199188 A1 * | 8/2010 | Abu-Hakima | ...... | H04L 12/1895 715/733 |
| 2010/0293239 A1 * | 11/2010 | Cross | .................... | H04L 12/581 709/206 |
| 2011/0072154 A1 * | 3/2011 | Bogdanovic | ............ | H04L 67/24 709/238 |
| 2012/0220314 A1 * | 8/2012 | Altman | .............. | G06Q 30/0207 455/456.3 |
| 2012/0233333 A1 * | 9/2012 | Ganesan | ............. | H04L 41/5051 709/227 |
| 2013/0190020 A1 * | 7/2013 | Ekberg | ................ | H04L 12/5865 455/466 |

(Continued)

Primary Examiner — Imad Hussain
(74) Attorney, Agent, or Firm — Edell, Shapiro & Finnan, LLC

(57) ABSTRACT

Techniques are provided for delivering messages to users of client devices in a network. At a server device in a network, location information of each of a plurality of client devices is obtained. Each of the client devices runs a presence application for a user in the network and is configured to log-in with one or more resources. A message is received from a sender device in the network. The message is intended to be presented to the user via the presence application and one or more of the resources. Based on the location information of the client devices, one or more designated client devices are selected to which the message is to be sent such that the message is presented to the user via the presence application running on the one or more designated client devices and via one or more of the resources.

20 Claims, 10 Drawing Sheets

(56) References Cited

U.S. PATENT DOCUMENTS

2014/0280541 A1\* 9/2014 Walter .................... H04L 67/30
709/204

\* cited by examiner

TECHNIQUES FOR AUTO-DETECTING POSITIONS IN A MULTI-RESOURCE LOGIN CONTROL OF INSTANT MESSAGING

TECHNICAL FIELD

The present disclosure relates to delivering messages to clients that support multi-resource login control in a network.

BACKGROUND

In network environments, a computing device may run presence application software ("presence software") that may be used by other devices in the network to locate and identify users of the computing device. For example, a user may log-in, via a client, with a resource. The client has presence software and is connected to a presence server. Upon logging in with the resource, the presence software causes the resource to publish or advertise presence information (e.g., "availability") for the user to the presence server. The presence server may then broadcast the availability for the user to other users logged-in at other resources that are also in communication with the presence server. In one example, clients may run Instant Messaging (IM) presence applications to enable instant text communications between users of network devices on the Internet via one or more presence servers. Often, clients and presence servers may support multi-resource logins by users. For example, a user may log-in, e.g., via presence software on one or more clients, with a first resource and a second resource, and the presence server to which the clients are connected may be configured to indicate a single availability for the user. Messages sent to the user via the presence server by another network device may then be received by the user via either the first resource or the second resource.

BRIEF DESCRIPTION OF THE DRAWINGS

FIG. 3 is an example of a message flow between a client configured to send a message to the presence server to be sent to a group of resources with which the user is logged in.

DESCRIPTION OF EXAMPLE EMBODIMENTS

Overview

Figure 1:
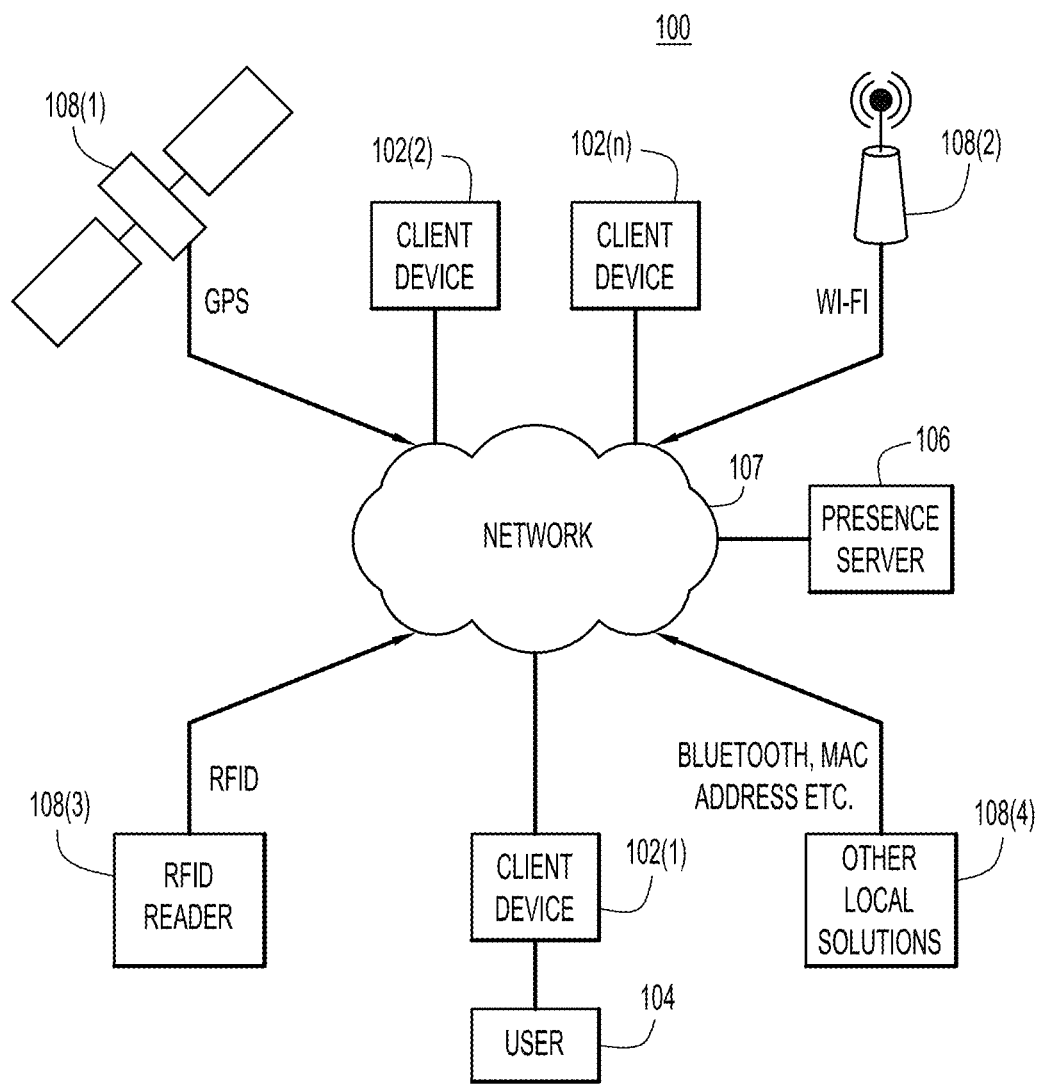
FIG. 1 shows an example network topology depicting a plurality of client devices ("clients") configured to interact with a presence server across a network.

Techniques are presented for delivering messages to users of client devices in a network that supports multi-resource login. At a server device in a network, location information of each of a plurality of client devices is obtained. Each of the plurality of client devices runs a presence application for a user in the network and is configured to log-in with one or more resources. A message is received from a sender device in the network. The message is intended to be presented to the user via the presence application and one or more of the resources. Based on the location information of each of the client devices, one or more designated client devices are selected from the plurality of client devices to which the message is to be sent. The message is then sent to the one or more designated client devices such that the message is presented to the user via the presence application running on the one or more designated client devices and via one or more of the resources.

Example Embodiments

The techniques described herein relate to client devices that support multi-resource login control in a network. In general, the client devices communicate with a presence server to enable messages to be delivered to users logged in with client devices and one or more resources accessible by the client devices. For example, a user may send log-in information to one or more client devices that host presence application software ("presence application" or "presence software"). The log-in information enables the user to log-in with a resource accessible by the client device and also enables the presence software on the client device to indicate presence of the user in the network. In one example, the presence software of the client devices (e.g., Instant Messaging (IM) or other communication software) causes the client devices to advertise to a server the user's availability to send and receive messages to other users logged in with other client devices (and other resources accessible by the other client devices).

An example system topology (hereinafter "system" or "user network") is shown at reference numeral 100 in FIG. 1. The user network 100 comprises a plurality of client devices, shown at reference numerals 102(1)-102(n). The client devices 102(1)-102(n) may be referred to hereinafter as "clients." The clients 102(1)-102(n) are configured to access one or more resources (not shown in FIG. 1), which may be software applications (hosted by the clients 102(1)-102(n) or other devices in the user network 100). For example, the resources may be accessible via a software application (e.g., a web browser) on the clients 102(1)-102(n). The resources accessible by the clients may enable network users to send messages to and receive messages from other users in the network via the clients, as described herein. A user, shown at reference numeral 104, may be configured to send log-in information (e.g., "log-in") with one or more of the clients 102(1)-102(n) to exchange communications with another user logged in with other clients in the network 100 and to access applications (e.g., software) hosted by the one or more of the clients 102(1)- 102(n).

In one example, the user 104 may enter user identity ("user ID") and password information to log-in with a client and may subsequently enter log-in credentials to access applications hosted by the client. For example, as described herein, the clients 102(1)-102(n) may each host presence software and may each be configured to access one or more resources. Thus, upon logging in with one or more of the client devices 102(1)-102(n), the user 104 may subsequently enter log-in credentials to access (e.g., to "sign-in" with) the presence software and the one or more resources. The clients 102(1)-102(n) may be configured as multi-resource devices, which enable the user 104 (and other users in the user network 100 not shown in FIG. 1) to log-in with multiple resources. For example, the user 104 may log-in, via a client, with a first resource using software of a client and may log-in to a second resource from a website. As described herein, when the user 104 logs-in with multiple resources, via one or more clients, and signs-in with the corresponding presence software on each of the clients, the presence software on each of the multiple clients displays to other clients and to other network users the availability of user 104 (e.g., availability to receive text, audio and video messages). In one example, this availability may be displayed as a single availability, even though the user is signed-in with multiple resources.

The user network 100 also has a server 106. The server 106 may be referred to hereinafter as a "presence server." The presence server 106 is configured to communicate with each of the clients 102(1)-102(n) via network 107 (e.g., a Local Area Network, Wide Area Network, etc.) to enable the clients 102(1)-102(n), and users logged in with the clients 102(1)-102(n), to send and receive messages to each other. For example, the presence server 106 may enable communications between the clients 102(1)-102(n) such that respective users signed-in with presence software at the clients 102(1)-102(n) can send messages to each other via the presence server 106.

The user network 100 also has a plurality of location solutions, shown at reference numerals 108(1)-108(4). The location solutions 108(1)-108(4) may be devices and/or systems that are enabled to detect locations of the clients 102(1)-102(n) and respective resources that are accessible by the clients via the network 107. The location solutions 108(1)-108(4) are also enabled to detect locations of groups of clients and resources accessible by the clients, e.g., by averaging location information of clients and the resources allocated to particular groups. For example, a group may contain client 102(1) and 102(2) (each of which are configured to access a first resource and a second resource), and the location information of this group of clients/resources may be an average location (e.g., geographic equidistant point between the clients) of client 102(1) and 102(2).

For example, as shown in FIG. 1, location solution 108(1) is a Global Positioning System (GPS) configured to determine location information of one or more of the clients 102(1)-102(n) Likewise, location solution 108(2) is a Wi-Fi® enabled system or device with location determination capabilities for a client, location solution 108(3) is a Radio-Frequency Identification (RFID) system/device and location solution 108(4) is a device or system that determines Media Access Control (MAC) address information, Internet Protocol (IP) address information, Bluetooth® location information or other location identifier information of a client. It should be appreciated that other location solutions may exist in the user network 100, and the location solutions 108(1)- 108(4) are merely examples. All of the location solutions 108(1)-108(4) are configured to determine location information of the clients 102(1)-102(n) (and resources accessible by the clients) and groups of clients/resources and are configured to send this location information to the presence server 106 via the network 107. Upon obtaining the location information for each of the clients/resources and groups of clients/resources, the presence server 106 is able to determine relative proximities of the clients 102(1)-102(n) to each other and relative proximities of groups of clients to other groups of clients. The location information of the clients 102(1)-102(n) is useful, for example, in selecting or designating groups of clients to which messages are to be sent and received and for selectively logging out users from presence software of the clients, as described by the techniques herein.

In general, it should be appreciated that the clients 102 (1)-102(n) may be computing devices, laptops, tablets, mobile phones, etc. that are configured to host presence software. Likewise, the presence server 106 may be any network server device that is also configured to host presence software. The presence software on the clients 102(1)- 102(n) enables a user 104 logged-in with one or more of the clients to sign-in with the presence software and with resources accessible by the clients in order to indicate his or her availability to the presence server 106 and to other devices in the user network 100. Users at the other devices in the user network 100 can then send messages to and receive messages from the user 104, via the clients and the resources with which the user 104 has logged in and via the presence server 106. In one example, the presence software on the clients 102(1)-102(n) is an IM system, and upon the user 104 signing-in to the IM system, the user's identity (e.g., username or "screen name") is displayed to other users signed-in with presence software on other clients. In addition to the user's identity, the IM system will display the user's availability to send and receive messages. For example, though the user 104 may be signed-in with presence software on a client and with a resource accessible by the client, the user may be away from the client or may be inactive. In this example, the presence of user 104 in the user network 100 will be displayed to other users but will be designated with an "idle" or "away" status. The availability of the user 104 may also indicate that the user is signed in, but that the user is "busy" or "unavailable" and thus unable to receive messages from other users in the user network 100.

Likewise, the presence software on the presence server 106 enables the presence server 106 to receive the availability information of user 104 signed-in with presence software hosted by the one or more clients in the user network 100. The presence software on the presence server 106 enables the presence server 106 to broadcast this availability information to users signed-in with presence software on other clients (and resources) in the user network 100. Additionally, the presence software on the presence server 106 enables the presence server 106 to forward messages to appropriate devices in the network to enable communications between the users of the clients. In one example, the presence software hosted by the clients 102 (1)-102(n) and the presence server 106 may be IM software that allows a user to send and receive text, audio or video messages to other users in the user network 100. As stated above, users in the user network 100 may log-in with multiple resource accessible by one or more of the clients 102(1)-102(n), and accordingly. The multiple sign-in capability enabled by the presence software is also known as "multi-resource log-in" or "multi-resource sign-in" for users to send and receive messages via the presence server 106.

After the user 104 signs-in with one or more resources, the user 104 may send messages to and receive messages from another user in the user network 100 who is signed-in with presence software on another client. For example, a user at another client (logged in with a resource via the other client) resource in the network may send messages to the user 104 via the presence server 106 and may receive messages from the user 104 via the presence server 106. For communications where another user is sending communications to user 104, the clients/resources with which the user 104 is logged in is referred to as the "receiving unit" or "receiver device," while the other client/resource with which the other user is logged in is referred to as the "sending unit" or "sender device."

Typically, when the user 104 is signed in with presence software on multiple resources, messages that are sent by other users in the user network 100 via the presence server 106 may be delivered to each of the corresponding clients and resources with which the user is logged in. That is, if the user 104 is signed-in with presence software on, e.g., a first resource via client 102(1) and a second resource via client 102(2), messages sent to the user 104 by other users will be delivered to both client 102(1) (and the first resource) and to client 102(2) (and the second resource). This may not be preferable, since the user 104 may only wish to receive the message at a single client (and a single resource) or at a particular group of some, but not all, of the clients/resources with which the user 104 is logged in. The selective delivery of messages to certain clients may be especially desirable if the messages are delivered with an accompanying sound notification, particularly if the sound notification will activate on every device with which the user 104 is logged in. The user 104 may not wish to receive a sound notification on all of these devices, especially of the devices are nearby one another. In other words, sending messages to all of the clients with which the user is logged in may cause an unnecessary disturbance for the user 104 and may degrade the user experience for the user 104 of the multiple clients.

The techniques described herein alleviate these problems by selecting a group of one or more clients to which messages are sent and received by the user 104. Additionally, the techniques described herein enable the presence server 106 (or any of the clients 102(1)-102(n)) to selectively sign-out the user 104 from presence software on certain clients/resources or groups of clients/resources. For example, messages may be sent and received to a subset of the total number of resources with which the user 104 is logged in. The presence server 106 may receive a message destined for the user 104, and the presence server 106 may forward the message to the appropriate group of clients/resources, based on the techniques described herein.

Figure 2:
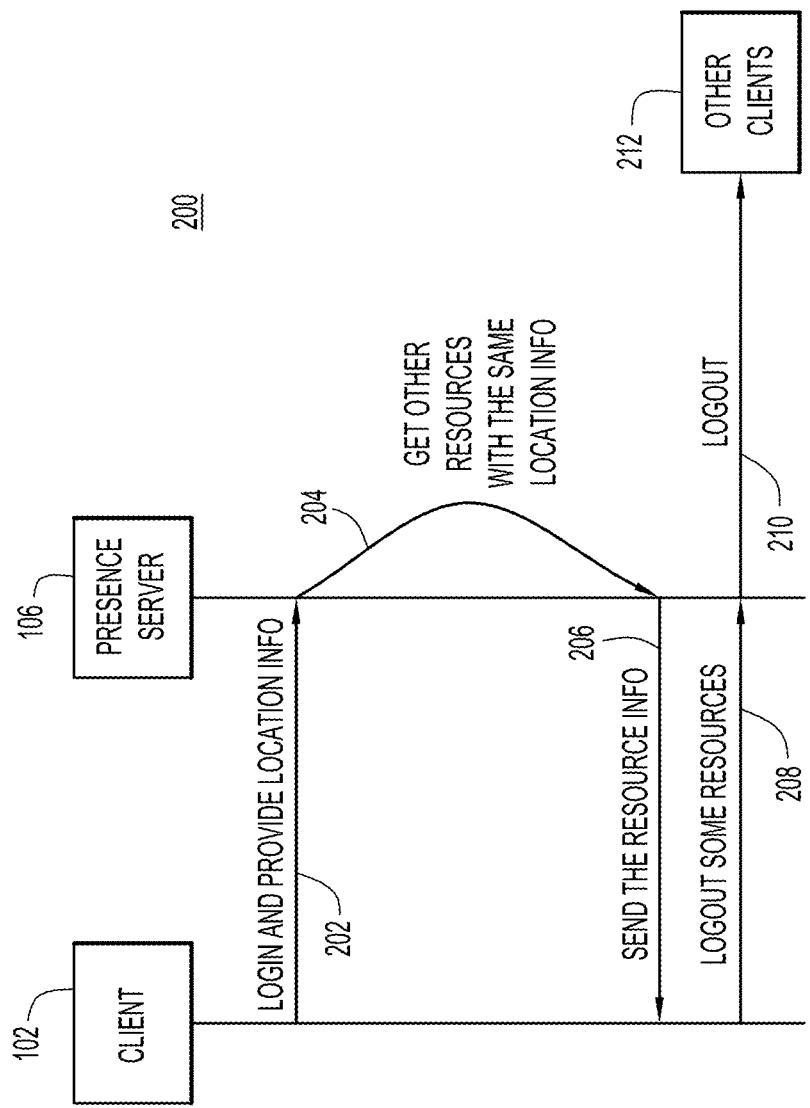
FIG. 2 shows an example diagram depicting a message flow between one of the clients and the presence server to selectively log-out a user from one or more resources.

Reference is now made to FIG. 2. FIG. 2 shows an example diagram 200 depicting a message flow between one of the clients 102(1)-102(n) and the presence server 106. The client in FIG. 2 is shown generally at reference numeral 102, though it should be appreciated that client 102 may be any of the clients 102(1)-102(n). FIG. 2 presupposes that the user 104 has already logged in with client 102 (and with one or more resources) and has signed-in with the presence software hosted by the client 102. It should be appreciated that the user 104 may also be logged in with other clients. Also, FIG. 2 presupposes that the client 102 has obtained its location information from one of the location solutions 108(1)-108(4) described in connection with FIG. 1 above.

The location information comprises information that indicates the location of the client 102 in the user network 100. At reference numeral 202 in FIG. 2, a message comprising the log-in information of the user 104 (e.g., the user ID that the user 104 utilized to sign-in with presence software of the client 102) and the location information of the client 102 is sent from the client 102 to the presence server 106. Upon receiving the message, the presence server 106, at 204, evaluates the location information of the client 102 and compares the location information of the client 102 with the location information of other clients where the user 104 has signed-in with presence software. For example, the presence server 106 may compare the location information of the client 102 with the location information of the other clients by accessing a database of location information previously sent to the presence server 104 by the other clients. The presence server 106 uses the user log-in information that it received from the clients 102 to determine the other clients with which the user 104 has logged in.

At reference numeral 206, the presence server 106 sends a message to the client 102 that contains a list of clients that the user 104 has already logged in with along with details regarding the location of each of the clients. Upon receiving the list of clients, the user 104 may select one or more designated client devices from the list to which messages destined for the user 104 are to be sent. Alternatively, the user 104 may select one or more clients from the list from which to sign-out of presence software. For example, the list of clients that is sent to the client 102 from the presence server 106 may also contain location information of the clients. The user 104 may then select a subset of the clients in the list as the designated clients based on the location information of the clients (e.g., by selecting clients that are located within a predetermined geographic range of each other) or the user 104 may select all or none of the clients in the list as designated clients. Upon the user 104 selecting the designated clients from the list, the clients 102, at reference numeral 208, sends a message to the presence server 106 instructing the presence server to logout the user 104 from clients that have not been selected by the user 104 as designated clients. The presence server 106 then sends a message, at reference numeral 210, to the other clients (depicted at reference numeral 212) to log-out the user 104 from the clients that are not selected by the user 104 as a designated client. Thus, the message diagram 200 in FIG. 2 depicts the scenario where the user 104 can selectively log-out of clients and can select one or more clients as designated clients to receive messages, via the presence server 106, from other users at other clients in the user network 100.

Figure 3:
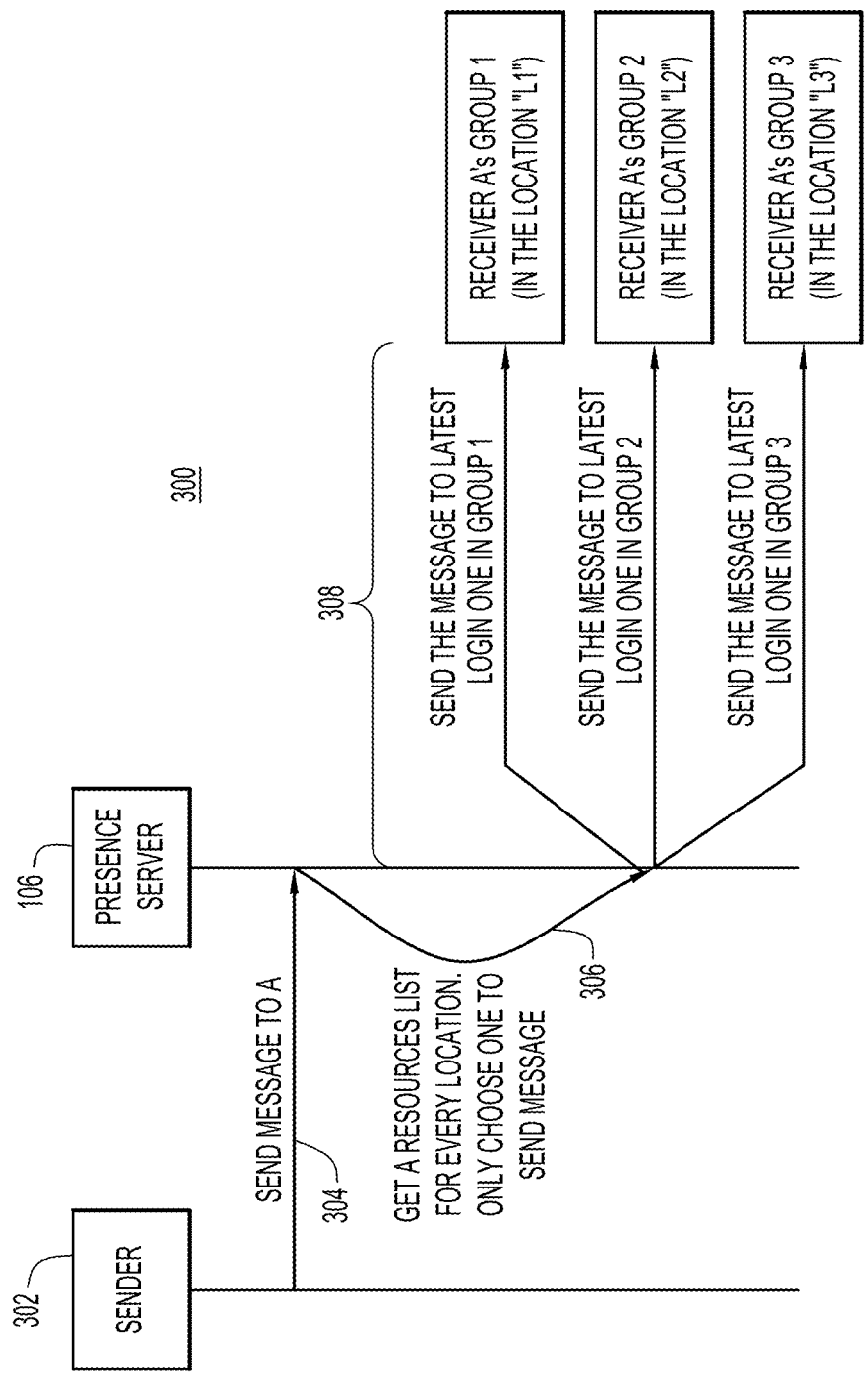

Reference is now made to FIG. 3, which shows an example message flow 300 between a sender device 302 and the presence server 106. As stated above, the sender device 302 may be a client or resource in the user network 100 that users may log-in with and may use to send messages to the user 104. At reference numeral 304 in FIG. 3, the sender device 302 sends a message to the presence server 106. The message is intended to be sent to the user 104 who is logged in with another client/resource and who is signed-in with presence software hosted on that client. After receiving the message from the sender device 302, the presence server 106, at reference numeral 306, obtains the location information of other clients/resources with which the user 104 is logged-in. The presence server 106 may then select one or more of the clients as designated clients to which the message received from the sender device 302 is to be sent. For example, the presence server 106 may select and divide the other clients/resources with which the user 104 is logged-in into groups based on respective location information and geographic proximity of the other clients such that clients in proximity to one another are classified in a same group. In another example, the presence server 106 may select the designated clients based on a most recent login event by the user 104 at the particular client/resource. The presence server 106 may select particular clients within a group as designated clients or may select entire groups of clients as designated clients. Upon grouping the clients, the presence server 106, at reference numeral 308, sends the message received from the sender device 302 to the appropriate group of clients to ultimately be delivered to the user 104.

Figure 4:
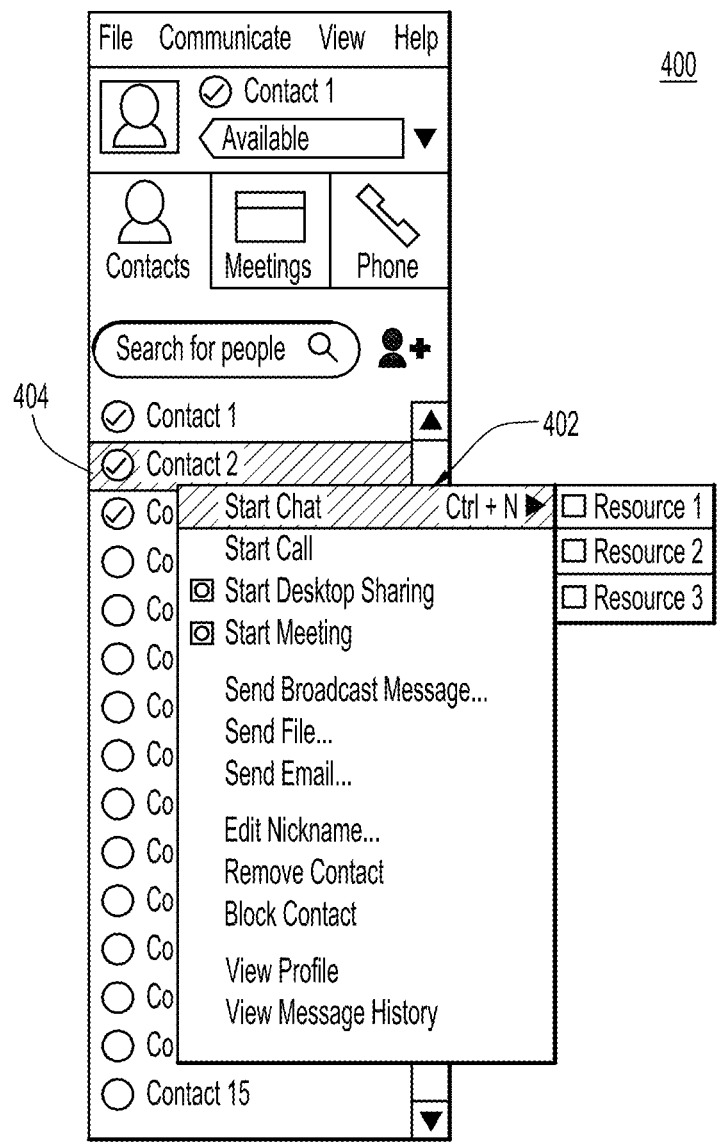
FIG. 4 is an example screen shot depicting a display presented to a user logged in with a presence application hosted by one of the clients to indicate a presence of the user logged in with one or more resources.

Reference is now made to FIG. 4. FIG. 4 shows an example screen shot 400 that shows the user 104 signed-in with the presence software hosted by one or more of the clients. As shown at reference numeral 402 in FIG. 4, upon signing-in with the presence software, the user 104 can send messages to other users in the user network 100 that are signed in with presence software on other clients. For example, the user 104 can start a "chat" (or other text, audio and/or video) with other users and can send and receive messages to the user. Additionally, the user 104 can select designated clients from which the user 104 is logged in to send messages to the other users and to receive messages from other users at those designated clients. For example, in FIG. 4, the user 104 can select "resource 1" (e.g., client device 102(1)) from which to send and receive messages to another user (e.g., user 404 shown in FIG. 4).

Figure 5:
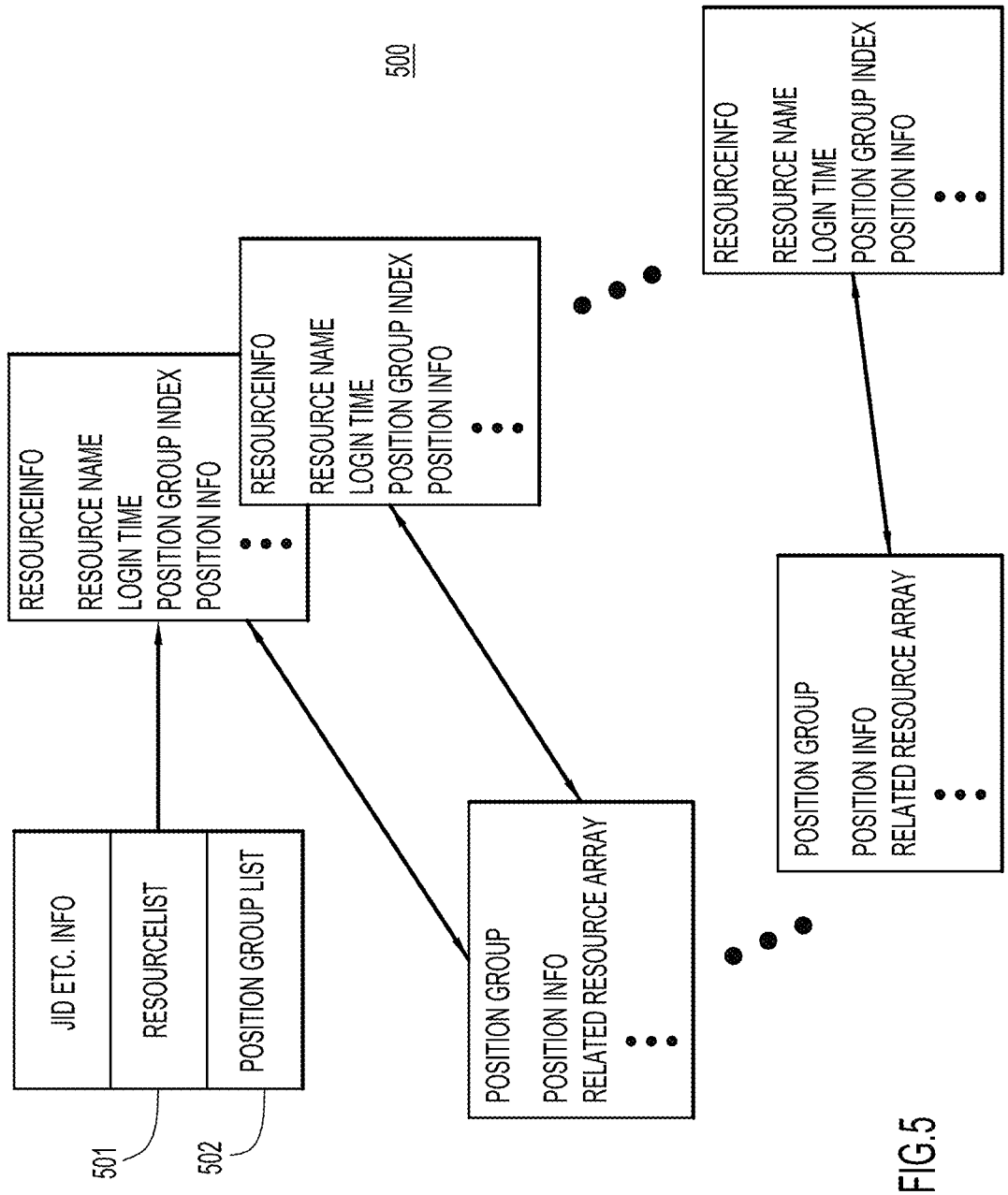
FIG. 5 shows an example data structure showing one or more resources allocated to one or more position groups.

Referring now to FIG. 5, an example data structure 500 is depicted that contains information about groups of clients/resources that are created and organized by the presence server 106 based on corresponding location information of the clients/resources in the user network 100. The data structure may be IM software identifier. As shown in FIG. 5, the clients 102(1)-102(n) and resources are maintained in a list (e.g., a "resource list" 501) and groups of clients and resources are maintained in a "position group list" 502 of the data structure. The data structure 500 contains location information (e.g., "position information") for each of the clients/resources and for the position groups themselves. As stated above, the position information of the position groups may be an average value of the position information for the clients and resources that comprise the position groups. The data structure 500 also contains information pertaining to the names of the clients and resources (e.g., "resource names"), log-in times of users, and other identifier information. In one example, the position information of a position group may comprise position information for each client and resource in the group (e.g., stored in an information array) and may derive an array value from the position information for the position information of a particular position group. The information contained in the data structure 500 can be utilized by the presence server 106 and/or the clients 102(1)-102(n) to designated particular clients or groups of clients to which messages are to be sent and received for the user 104 (and other users in the user network 100).

Figure 6:
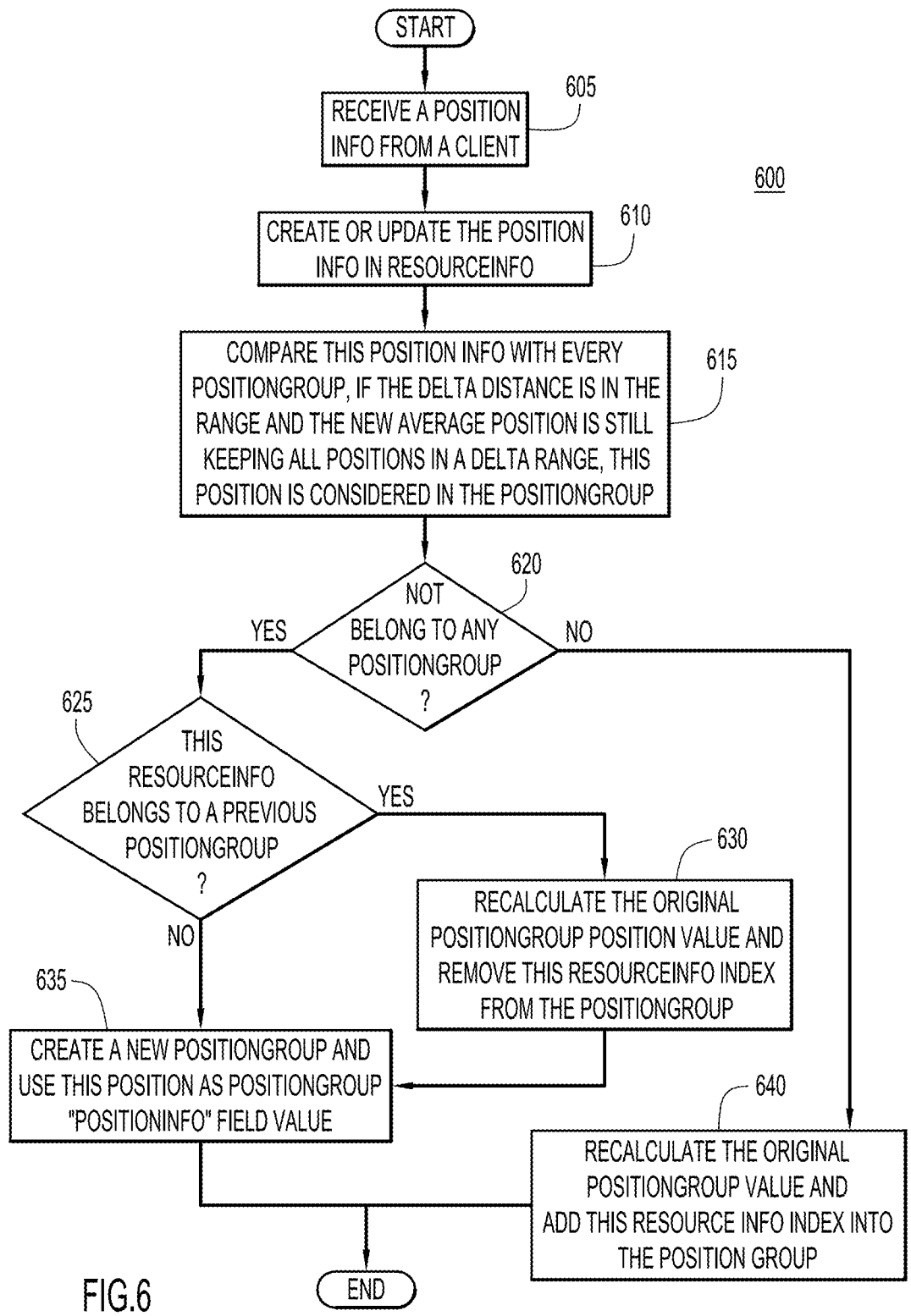
FIG. 6 shows an example flow chart depicting operations for allocating resources into the position groups.

Reference is now made to FIG. 6. FIG. 6 shows an example flow chart 600 depicting operations for allocating clients into position groups and for selecting clients and groups of clients as designated clients to send and receive messages for users in the network. It should be appreciated that the operations in the flow chart 600 may be performed by the presence server 106 or any of the clients 102(1)-102(n) in the user network 100. For simplicity, the operations of the flow chart 600 will be described as being performed by the presence server 106 with respect to clients, though it should be appreciated that these techniques may also be applicable to location determination and allocation of the resources themselves. At operation 605, the presence server 106 receives position information (e.g., location information) associated with a client/resource. The presence server 106, at operation 610, updates or stores this position information for the client, and at operation 615, the presence server 106 compares the position information with position information associated with groups of other clients in the user network 100. After the comparison is made, the position information is used to calculate a geographic distance between the client and the groups of clients. If the distance between the client and one of the groups of client is less than or equal to a threshold distance, the client is included into that particular group of client. If the distance between the client and one of the groups of client is greater than the threshold distance, the client is not included in that particular group of client.

Thus, at operation 620, a determination is made as to whether or not the client is included in any groups of clients (e.g., a position group or "postiongroup" as indicated in FIG. 6). If so, at operation 625, a determination is made as to whether the clients previously belonged to another group. If the answer to operation 625 is yes, then, at operation 630, the position information of the original group is recalculated and the client is removed from the list of clients in the original group. A new position group is then created at operation 635 that lists the client. If the answer to operation 625 is no, then the new position group is created as described in operation 635. If the answer to operation 620 is no (i.e., if the determination is made that the client is not included in any prior group), at operation 640, the position information of the client is added to the new position group.

Figure 7:
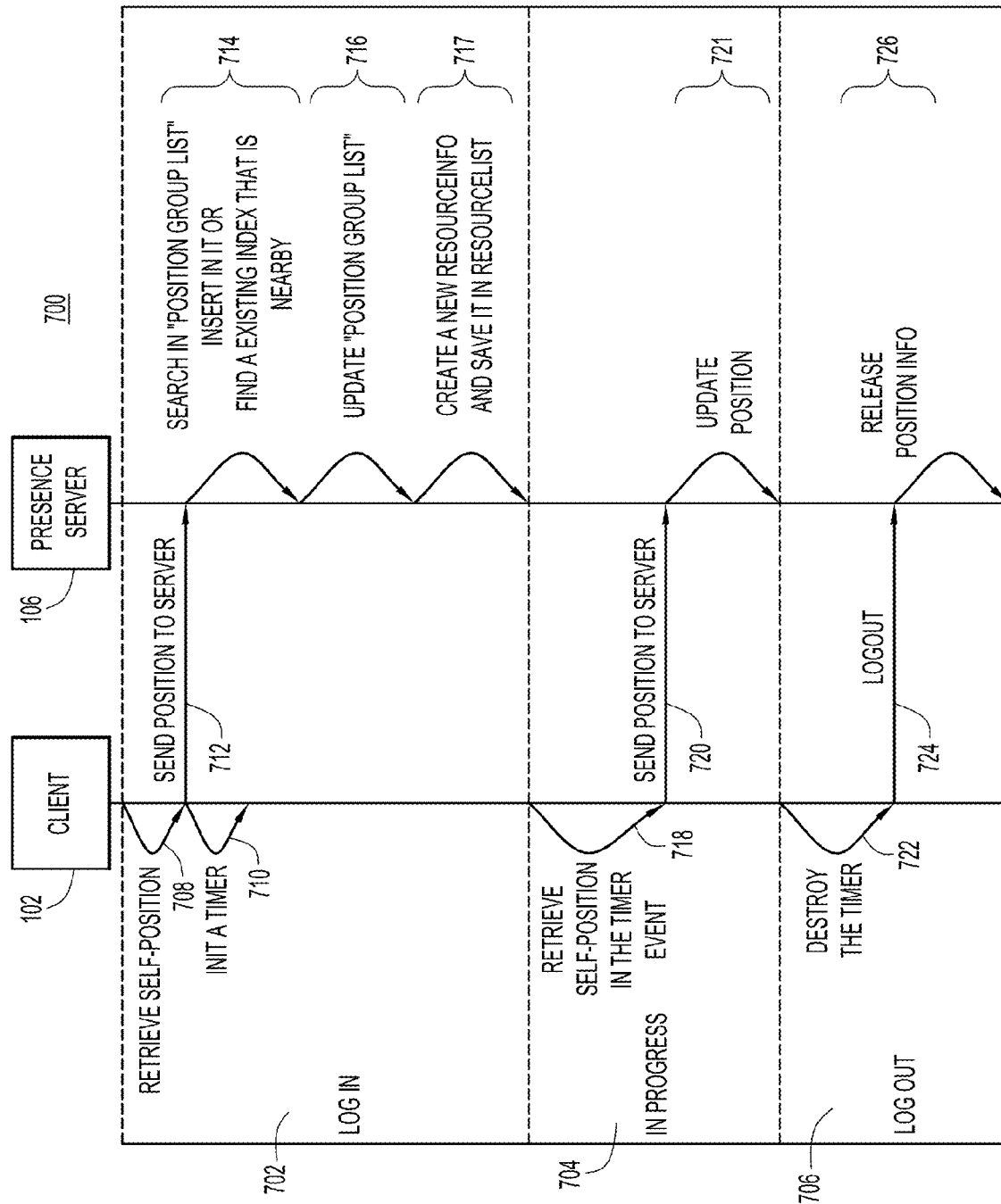
FIG. 7 shows an example diagram of message exchanges between a client and a presence server for updating the allocation of resources into the ass.

Reference is now made to FIG. 7. FIG. 7 shows an example diagram 700 of techniques for updating the allocation of clients (and resources) into position groups. Diagram 700 is divided into three processing stages: a log-in stage, shown at reference numeral 702, an "in progress" stage shown at reference numeral 704 and a "log-out" stage shown at reference numeral 706.

In the log-in stage, the client 102 (which may be any of the clients 102(1)-102(n) in the user network 100) first retrieves its location information, as shown at reference numeral 708, and starts a timer, as shown at reference numeral 710. At 712, the client 102 sends to the presence server 106 a message comprising the location information (e.g., "position") of the client 102. The presence server 106, upon receiving the message, searches a list of clients in various position groups to determine which client and/or position group is nearby. This operation is shown at reference numeral 714. At 716, the presence server 106 updates the position group list to include the client 102 and creates a new data structure entry, at 717, into the resource list. In general, at the login stage, a client will utilize any location solution to determine its own position and will send the position to the presence server 106. When the position is sent to the presence server 106, the presence server 106 will judge whether the client should belong to a current existing group or whether the client should be added to a new group. The presence server 106 stores the position information for the client and the client group (if appropriate).

In the in-progress stage, the client 102 retrieves, at 718, self-position information and at 720 sends the position information to the presence server 106. The presence server 106 updates the position information at 721. For example, the client will respond to an event (e.g., a message exchange) within a predetermined period of time (e.g., 10 seconds), and upon responding, the position of the client will be recalculated. Updates to the position of the client will then be sent to the presence server 106. In the log-out stage, at 722, the client 102 ends the timer and sends a message, at 724, to log-out of the presence server 106. The presence server 106, upon receiving the logout message, releases (e.g., deletes) the position information at 726. Likewise, position information of a group may also be deleted if there are no more members of the group.

Figure 8:
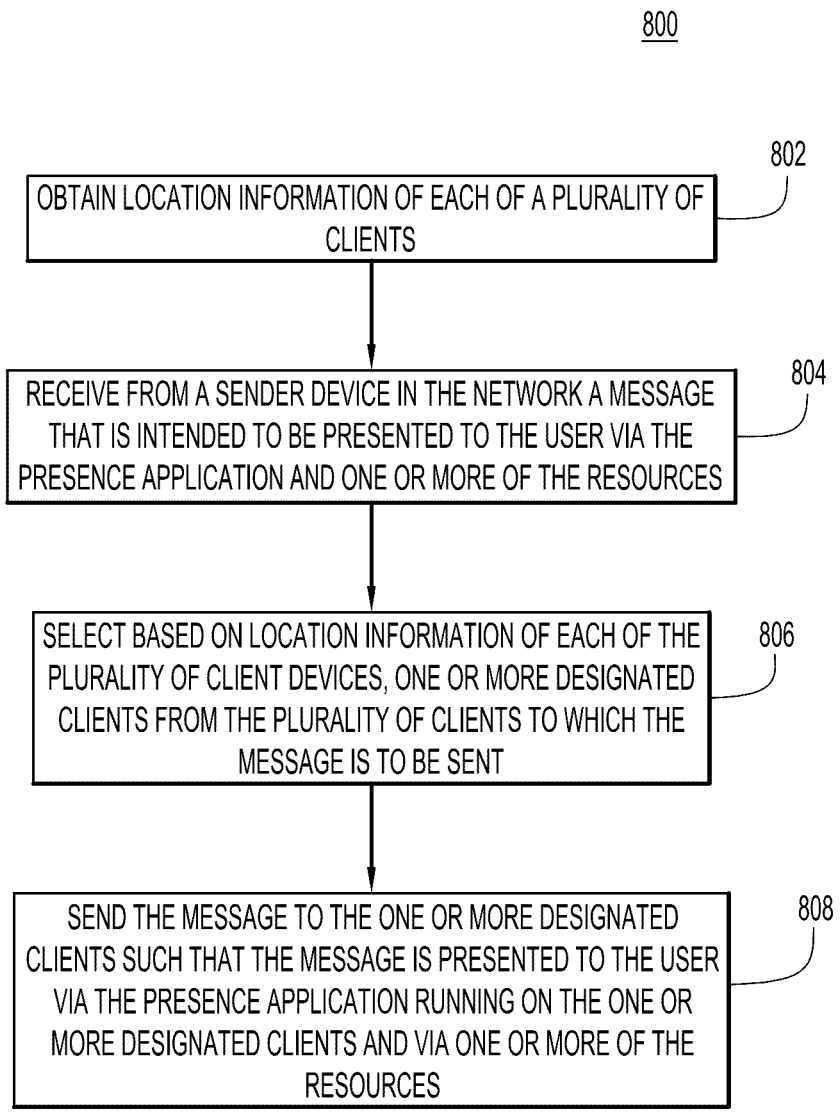
FIG. 8 shows an example flow chart depicting operations for selectively sending messages to one or more designated clients via the presence server.

Reference is made to FIG. 8, which depicts an example flow chart 800 that shows operations for selectively sending messages to one or more designated clients via the presence server 106. At operation 802, location information is obtained for each of a plurality of clients. Each of the clients runs a presence application (presence software) for the user 104 and is configured to log-in with one or more resources. At operation 804, a message is received from a sender device in the network. The message is intended to be presented to the user 104 via the presence application on one or more of the plurality of clients and one or more of the resources accessible by the clients. One or more designated clients are selected, at operation 806, based on information of each of the plurality of clients to which the message is to be sent. At operation 808, the message is sent to the one or more designated clients such that the message is presented to the user via the presence application running on one or more designated clients and via one or more of the resources.

Figure 9:
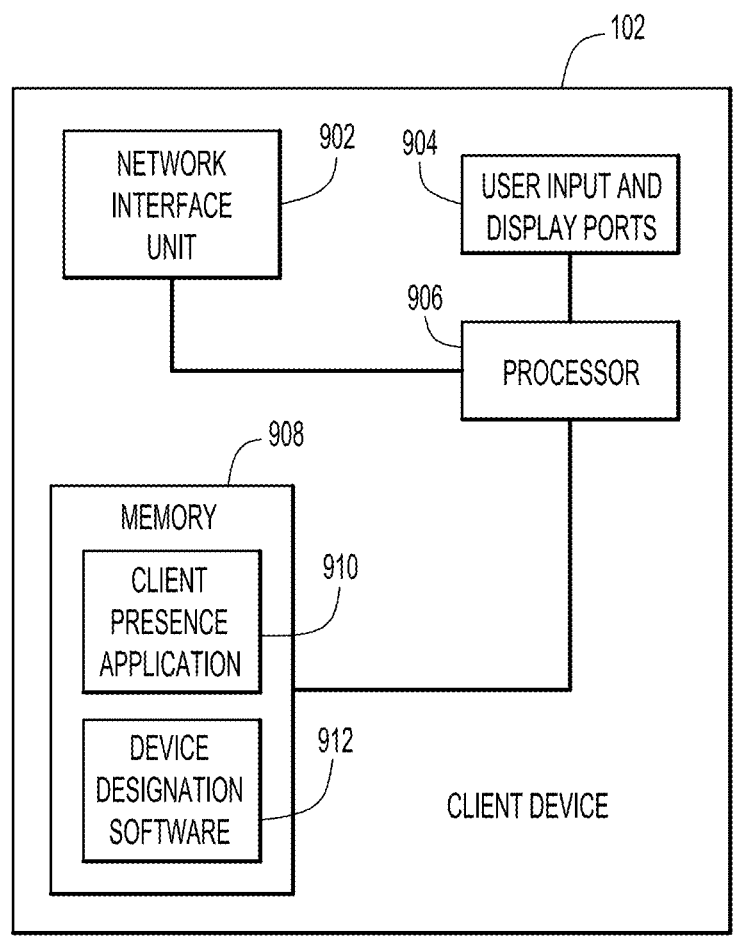
FIG. 9 shows a block diagram of a client configured to host a presence application and to designate one or more resources accessible by the client as belonging to one or more position groups.

Reference is now made to FIG. 9. FIG. 9 shows a block diagram of a client device configured to host a presence application (presence software) and to designate the client device as belonging to one or more position groups. The client device is shown generally at reference numeral 102, though it should be appreciated that client device 102 may be any of the client devices 102(1)-102(n) in the user network 100, shown in FIG. 1, above. The client device 102 has a network interface unit 902, a user input and display ports 904, a processor 906 and a memory 908.

The network interface unit 902 is configured to send and receive communications (e.g., data packets and other communications) to devices (e.g., the presence server 106 and other client devices) in the user network 100. The user input and display ports 904 may comprise ports for a keyboard (or other input unit) and a monitor (or other display unit) that is configured to enable a user (e.g., user 104) to log-in with the client device and with presence application software hosted by the client device 102. For example, the user input and display unit 904 ports for a keyboard, mouse, as well as ports for a headset (microphone/earpiece), display, etc. The processor 906 is, for example, a microprocessor or microcontroller that is configured to execute program logic instructions (i.e., software) for carrying out various operations and tasks of the client device 102, as described herein. For example, the processor 906 is configured to execute the client presence application (presence software) 910 and the device designation software 912 to selectively designated client devices to which messages are to be sent to and from a user signed-in with the presence software. The functions of the processor 906 may be implemented by logic encoded in one or more tangible computer readable storage media or devices (e.g., storage devices compact discs, digital video discs, flash memory drives, etc. and embedded logic such as an application specific integrated circuit, digital signal processor instructions, software that is executed by a processor, etc.).

The memory 908 may comprise read only memory (ROM), random access memory (RAM), magnetic disk storage media devices, optical storage media devices, flash memory devices, electrical, optical, or other physical/tangible (non-transitory) memory storage devices. The memory 908 stores instructions for the client presence application 910 and the device designation software 912. Thus, in general, the memory 908 may comprise one or more computer readable storage media (e.g., a memory storage device) encoded with software comprising computer executable instructions and when the software is executed (e.g., by the processor 906) it is operable to perform the operations described herein.

The client presence application 910 and the device designation software 912 may take any of a variety of forms, so as to be encoded in one or more tangible computer readable memory media or storage device for execution, such as fixed logic or programmable logic (e.g., software/computer instructions executed by a processor), and the processor 906 may be an application specific integrated circuit (ASIC) that comprises fixed digital logic, or a combination thereof.

In still another example, the processor 906 may be embodied by digital logic gates in a fixed or programmable digital logic integrated circuit, which digital logic gates are configured to execute the client presence application 910 and the device designation software 912. In general, the client presence application 910 and the device designation software 912 may be embodied in one or more computer readable storage media encoded with software comprising computer executable instructions and when the software is executed operable to perform the operations described above.

Figure 10:
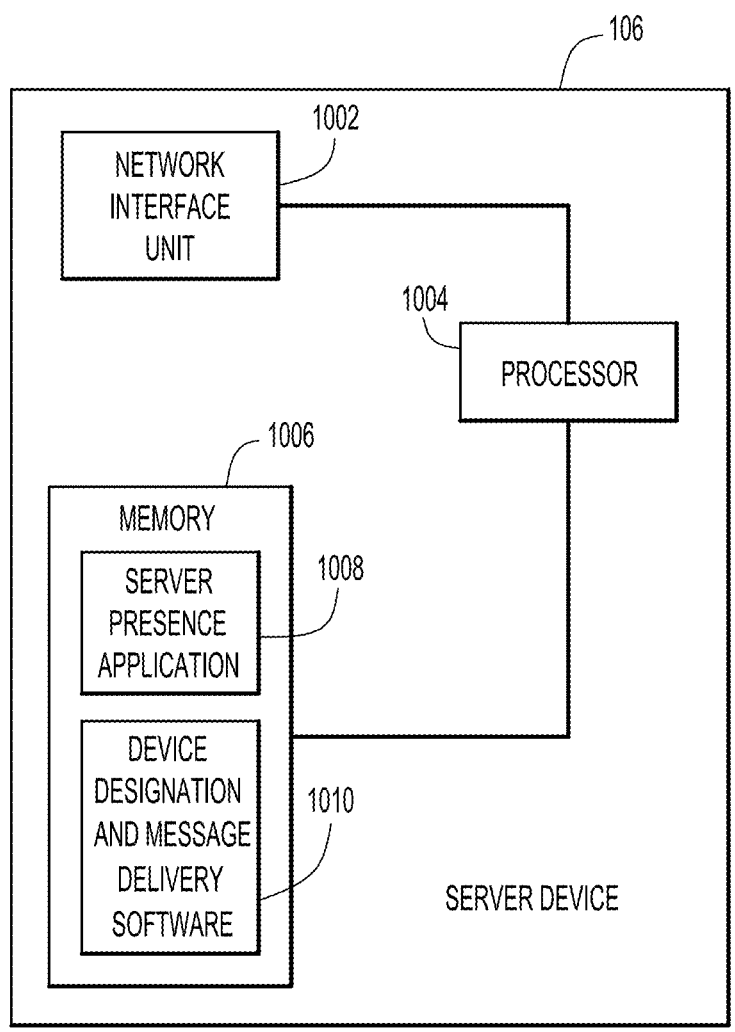
FIG. 10 shows a block diagram of a presence server configured to host a presence application and to deliver messages to one or more clients and to resources accessible by the clients.

Reference is now made to FIG. 10, which shows an example block diagram of the presence server 106. The presence server 106 comprises a network interface unit 1002, a processor 1004 and a memory 1006. The network interface unit 1002 of the presence server 106 is similar to the network interface unit 902 of the client device 102 and is configured to send and receive messages to devices (e.g., to other client devices) in the user network 100. The processor 1004 of the presence server is also similar to the processor 906 of the client device 102. The processor 1004 is configured to execute the server presence application (presence software) 1008 and the device designation and message delivery software 1010 to selectively designated client devices to which messages are to be sent to and from a user signed-in with the presence software and to send messages to the appropriate client devices.

The memory 1006 is similar to the memory 908 of the client device 102. The memory 1006 may comprise read only memory (ROM), random access memory (RAM), magnetic disk storage media devices, optical storage media devices, flash memory devices, electrical, optical, or other physical/tangible (non-transitory) memory storage devices. The memory 908 stores instructions for the server presence application 1008 and the device designation and message delivery software 1010.

It should be appreciated that the techniques described above in connection with all embodiments may be performed by one or more computer readable storage media that is encoded with software comprising computer executable instructions to perform the methods and steps described herein. For example, the operations performed by the client devices 102(1)-102(n) and the presence server 106 may be performed by one or more computer or machine readable storage media (non-transitory) or device executed by a processor and comprising software, hardware or a combination of software and hardware to perform the techniques described herein.

In summary, a method is provided comprising: a server device in a network obtaining location information of each of a plurality of client devices, wherein each of the plurality of client devices runs a presence application for a user in the network and is configured to log-in with one or more resources; receiving from a sender device in the network a message that is intended to be presented to the user via the presence application and one or more of the resources; selecting, based on location information of each of the plurality of client devices, one or more designated client devices from the plurality of client devices to which the message is to be sent; and sending the message to the one or more designated client devices such that the message is presented to the user via the presence application running on the one or more designated client devices and via one or more of the resources.

In addition, one or more computer readable storage media is provided that is encoded with software comprising computer executable instructions and when the software is executed operable to: obtain at a server device in a network location information of each of a plurality of client devices, wherein each of the plurality of client devices runs a presence application for a user in the network and is configured to log-in with one or more resources; receive from a sender device in the network a message that is intended to be presented to the user via the presence application and one or more of the resources; select based on location information of each of the plurality of client devices, one or more designated client devices from the plurality of client devices to which the message is to be sent; and send the message to the one or more designated client devices such that the message is presented to the user via the presence application running on the one or more designated client devices and via one or more of the resources.

Additionally, an apparatus is provided comprising: a network interface unit configured to enable network communications; a memory; and a processor coupled to the network interface unit and the memory and configured to: obtain location information of each of a plurality of client devices, wherein each of the plurality of client devices runs a presence application for a user in the network and is configured to log-in with one or more resources; receive from a sender resource in the network a message that is intended to be presented to the user via the presence application and one or more of the resources; select based on location information of each of the plurality of client devices, one or more designated client devices from the plurality of client devices to which the message is to be sent; and send the message to the one or more designated client devices such that the message is presented to the user via the presence application running on the one or more designated client devices and via one or more of the resources.

The above description is intended by way of example only. Various modifications and structural changes may be made therein without departing from the scope of the concepts described herein and within the scope and range of equivalents of the claims.

What is claimed is:

1. A method comprising:
    at a server device in a network, obtaining location information of each of a plurality of client devices associated with a single user as part of a presence application, wherein each of the plurality of client devices runs the presence application and where the user logs in with one or more resources via each of the plurality of client devices;
    receiving from a sender device in the network a message that is intended to be presented to the user at one or more of the plurality of client devices via the presence application and at least one of the one or more resources;
    grouping the plurality of client devices into a plurality of device groups based on the relative geographic proximity of the plurality of devices to one another as indicated by the location information, wherein at least one of the plurality of device groups includes two or more of the plurality of client devices;
    selecting a single particular client device in each of the plurality of device groups as a designated client device to which the message is to be sent; and
    sending the message to only the designated client device in each of the plurality of device groups such that the message is presented to the user via the presence application running on only designated client devices.

2. The method of claim 1, further comprising logging the user out of the presence application on remaining ones of the plurality of client devices that are not selected as one of the designated client devices.

3. The method of claim 1, wherein selecting a single particular client device as a designated client device further comprises:
    determining a most recent login event by the user at each of the two or more of the plurality of client devices; and
    selecting one of the two or more of the plurality of client device having the most recent login event by the user.

4. The method of claim 1, wherein obtaining the location information comprises obtaining location information from at least one of: Global Positioning System (GPS) information, Media Access Control (MAC) address information, Radio Frequency Identifier (RFID) information and Internet Protocol (IP) address information.

5. The method of claim 1, further comprising sending a list of the designated client devices to other devices in the network to cause the other devices in the network to send messages from the user and present messages to the user via a respective presence application running on the designated client devices.

6. The method of claim 1, further comprising:
    at one of the client devices in the network, receiving log-in information from the user associated with the plurality of client devices, wherein the log-in information enables the user to log-in with a first one of the one or more resources and enables the presence application to indicate presence of the user in the network;
    presenting to the user information indicating a plurality of other client devices to which the user has sent login information;
    receiving an input from the user, the input selecting one or more selected client devices from the plurality of other client devices, wherein the one or more selected client devices maintain the presence of the user while the client devices that are not the one or more designated client devices log the user out; and
    sending the list of the one or more selected client devices to other devices in the network.

7. The method of claim 6, wherein sending the list comprises sending the list to other devices in the network to cause the other devices in the network to send messages to the one or more selected client devices to maintain the presence of the user.

8. The method of claim 6, wherein receiving the input comprises receiving the input to select the one or more selected client devices based on proximity information indicating locations of the one or more selected client devices relative to the one client device.

9. The method of claim 6, wherein receiving the input comprises receiving the input to select the one or more selected client devices based on recent login events by the user at the plurality of the other client devices.

10. One or more non-transitory computer readable storage media encoded with software comprising computer executable instructions and when the software is executed operable to:
- obtain, at a server device in a network, location information of each of a plurality of client devices associated with a single user as part of a presence application, wherein each of the plurality of client devices runs the presence application and where the user logs in with one or more resources via each of the plurality of client devices;
- receive from a sender device in the network a message that is intended to be presented to the user at one or more of the plurality of client devices via the presence application and at least one of the one or more resources;
- group the plurality of client devices into a plurality of device groups based on the relative geographic proximity of the plurality of devices to one another as indicated by the location information, wherein at least one of the plurality of device groups includes two or more of the plurality of client devices;
- select a single particular client device in each of the plurality of device groups as a designated client device to which the message is to be sent; and
- send the message to only the designated client device in each of the plurality of device groups such that the message is presented to the user via the presence application running on only designated client devices.

11. The non-transitory computer readable storage media of claim 10, further comprising instructions operable to log the user out of the presence application on remaining ones of the plurality of client devices that are not selected as one of the designated client devices.

12. The non-transitory computer readable storage media of claim 10, wherein the instructions operable to select a single particular client device as a designated client device further comprise instructions operable to:
- determine a most recent login event by the user at each of the two or more of the plurality of client devices; and
- select one of the two or more of the plurality of client device having the most recent login event by the user.

13. The non-transitory computer readable storage media of claim 10, wherein the instructions operable to obtain the location information comprises instructions operable to obtain location information from at least one of: Global Positioning System (GPS) information, Media Access Control (MAC) address information, Radio Frequency Identifier (RFID) information and Internet Protocol (IP) address information.

14. The non-transitory computer readable storage media of claim 10, further comprising instructions operable to, at one of one of the client devices in the network:
- receive log-in information from the user associated with the plurality of client devices, wherein the log-in information enables the user to log-in with a first one of the one or more resources and enables the presence application to indicate presence of the user in the network;
- present to the user information indicating a plurality of other client devices to which the user has sent login information;
- receive an input from the user, the input selecting one or more selected client devices from the plurality of other client devices, wherein the one or more selected client devices maintain the presence of the user while the client devices that are not the one or more designated client devices log the user out; and
- sending the list of the one or more selected client devices to other devices in the network.

15. The non-transitory computer readable storage media of claim 14, wherein the instructions operable for sending the list comprise instructions operable for sending the list to other devices in the network to cause the other devices in the network to send messages to the one or more selected client devices to maintain the presence of the user.

16. An apparatus comprising:
- a network interface unit configured to enable network communications;
- a memory; and
- a processor coupled to the network interface unit and the memory, and configured to:
  - obtain location information of each of a plurality of client devices associated with a single user as part of a presence application, wherein each of the plurality of client devices runs the presence application and where the user logs in with one or more resources via each of the plurality of client devices;
  - receive from a sender device in the network a message that is intended to be presented to the user at one or more of the plurality of client devices via the presence application and at least one of the one or more resources;
  - group the plurality of client devices into a plurality of device groups based on the relative geographic proximity of the plurality of devices to one another as indicated by the location information, wherein at least one of the plurality of device groups includes two or more of the plurality of client devices;
  - select a single particular client device in each of the plurality of device groups as a designated client device to which the message is to be sent; and
  - send the message to only the designated client device in each of the plurality of device groups such that the message is presented to the user via the presence application running on only designated client devices.

17. The apparatus of claim 16, wherein the processor is further configured to initiate a log out of the user from the presence application on remaining ones of the plurality of client devices that are not selected as one of the designated client devices.

18. The apparatus of claim 16, wherein to select a single particular client device as a designated client device, the processor is further configured to:
- determine a most recent login event by the user at each of the two or more of the plurality of client devices, and
- select one of the two or more of the plurality of client device having the most recent login event by the user.

19. The apparatus of claim 16, wherein the location information comprises at least one of: Global Positioning System (GPS) information, Media Access Control (MAC) address information, Radio Frequency Identifier (RFID) information and Internet Protocol (IP) address information.

20. The apparatus of claim 16, wherein the processor is further configured to send a list of the designated client devices to other devices in the network to cause the other devices in the network to send messages from the user and present messages to the user via a respective presence application running on the designated client devices.

* * * * *